United States Patent [19]
Kuwabara et al.

[11] 3,714,541
[45] Jan. 30, 1973

[54] VOLTAGE CONTROL APPARATUS FOR AC GENERATORS

[75] Inventors: Takeo Kuwabara; Hisakatsu Kiwaki; Hiroshi Sato; Yoshimitsu Onoda, all of Katsuta, Japan

[73] Assignee: Hitachi, Ltd., Tokyo, Japan

[22] Filed: April 19, 1971

[21] Appl. No.: 135,229

[30] Foreign Application Priority Data

April 22, 1970 Japan ..................................45/33868

[52] U.S. Cl. ..........................322/24, 322/28, 322/32, 322/59
[51] Int. Cl. ...............................................H02p 9/30
[58] Field of Search................322/24, 28, 29, 32, 59

[56] References Cited

UNITED STATES PATENTS

| | | | |
|---|---|---|---|
| 2,797,382 | 6/1957 | Woerdemann | 322/29 X |
| 3,121,836 | 2/1964 | Rosenberry | 322/24 |
| 3,238,439 | 3/1966 | Hobbs et al. | 322/32 X |

Primary Examiner—E. A. Goldberg
Assistant Examiner—H. Huberfeld
Attorney—Craig and Antonelli

[57] ABSTRACT

A saturable reactor is excited by the output of an AC generator, the field of which is controlled by a current exciting the reactor. Since the exciting current of the saturable reactor is proportional to an input voltage, the ratio of the output voltage to the output frequency of the AC generator is maintained constant.

11 Claims, 5 Drawing Figures

VOLTAGE CONTROL APPARATUS FOR AC GENERATORS

BACKGROUND OF THE INVENTION

1. Field of the Invention

This invention relates to a voltage control apparatus for AC generators or more in particular for AC generators which, as will be described later, are used as an auxiliary power supply for an electric car whose input voltage greatly varies.

2. Description of the Prior Art

An AC generator driven by a DC motor is used in most cases as a power supply for coolers and heaters installed in a DC electric car on an electric railway. However, DC input voltages which are obtained from trolley wires are subject to great variations in an approximate range from −40 to +20 percent. This causes great variation in the output frequency of the AC generator, and therefore it is common to take some measures to maintain a constant voltage output from the AC generator in addition to the constant-velocity control of the DC motor.

However, in controlling a cooling or heating device with a relatively large time constant which is used with an induction motor, it suffices in most cases to maintain the output voltage in proportion to the output frequency instead of maintaining them at a fixed level respectively.

SUMMARY OF THE INVENTION

It is an object of this invention to provide a means capable of maintaining the ratio of output voltage to output frequency of a generator of the above-mentioned kind at a fixed level.

Another object of this invention is to provide a small-sized means with a simple construction which is capable of performing such a controlling operation.

The voltage control apparatus according to this invention comprises an AC generator, a motor for driving the generator and a saturable reactor excited by the output voltage of the above-mentioned generator and which produces an exciting current proportional to the output of the generator.

DESCRIPTION OF THE PREFERRED EMBODIMENTS

Embodiments of the invention will be explained below with reference to the drawings.

Figure 1:
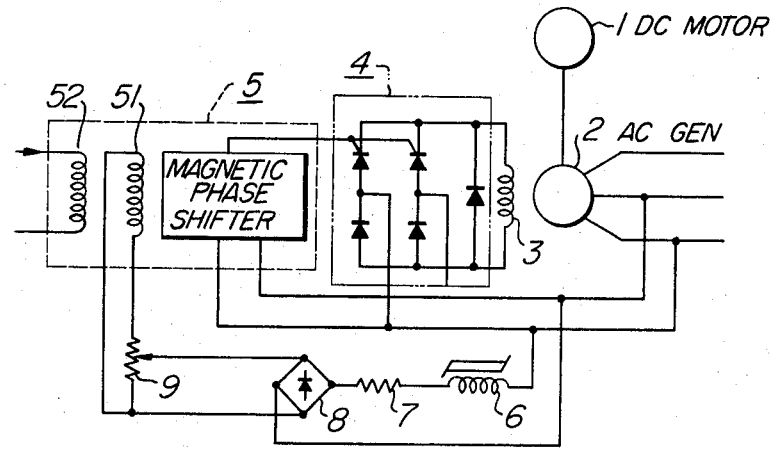
FIG. 1 shows an embodiment of this invention.

Referring to FIG. 1, a DC motor 1 is for driving an AC generator 2 which is provided with a field winding 3. Also, the field winding 3 is connected with a thyristor device 4 comprising thyristors and diodes for controlling the current flowing in the field winding 3. The gate of the thyristor device 4 is controlled by a magnetic phase shifter 5. The output terminal of the AC generator 2 is connected with a saturable reactor 6 whose exciting current flows through a series resistor 7 and a rectifier 8 to a currentdividing resistor 9. This current-dividing resistor 9 is included in the circuit of a control winding 51 of the magnetic phase shifter 5.

In the above-mentioned circuit arrangement, it is necessary to set a reference value of output voltage proportional to a frequency in order to control the AC generator 2 in such a manner that its output voltage is proportional to its output frequency. According to this invention, such a reference is obtained from a terminal voltage across the saturable reactor 6. In other words, when a sine-wave AC voltage E$a$ (frequency $f$) is applied to an iron core (with a rectangular magnetic characteristic) of the saturable reactor 6, the following relation is established:

$$Ea = 4.44 f \cdot Bm \cdot A \cdot n \quad (1)$$

where $Bm$ is the density of a saturated magnetic flux, $A$ is the area of the cross section of the iron core and $N$ is the number of turns of the winding. Under this condition, the iron core is saturated, and the voltage across the terminals of the reactor 6 is maintained at a fixed level determined by the above formula even if Ea is made larger. Since this value is proportional to the frequency f, it can be used as a reference voltage.

Next, in order to obtain an amount proportional to the difference between the reference voltage and the output voltage of the AC generator 2, the exciting current of the saturable reactor 6 for generating the reference voltage is used. In other words, the voltage-current characteristic of the reactor 6 including the series resistor 7 is as shown in FIG. 2, from which it is apparent that when the applied voltage, namely, the output voltage of the AC generator 2, exceeds the reference voltage determined by the equation (1), there flows an exciting current proportional to the difference between the output voltage of the AC generator 2 and the reference voltage, and the degree of the proportion may be adjusted by regulating the value of the series resistor 7.

Figure 2:
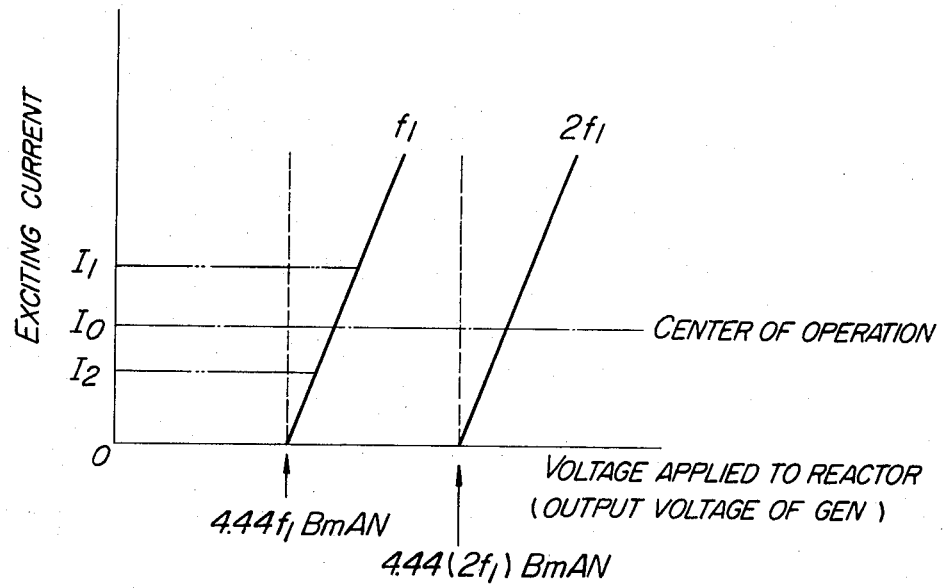
FIG. 2 is a diagram showing the characteristics of a saturable reactor employed in this invention.

In addition, in order to cope with a variety of causes to vary the output voltage both positively and negatively, it is necessary to shift the center of operation of the reactor 6 more to the positive side as is shown by one dotted chain line of FIG. 2. However, since an additional input corresponding to the above-mentioned shifted amount is applied to the magnetic phase shifter 5, a bias winding 52 as shown in FIG. 1 is provided for the purpose of offsetting the resulting distorted operation of the magnetic phase shifter 5. Incidentally, in FIG. 2, the dotted lines show a case without the series resistor 7, while the solid lines indicate a case employing the resistor 7.

The operation of the apparatus according to the invention will be now explained with reference to FIGS. 1 to 3. The characteristics of the saturable reactor 6 including the series resistor 7 in accordance with the output frequency variation of the AC generator 2 are as shown by the lines $f_1$ and $2f_1$, while the voltages across the terminals of the saturable reactor 6, namely, the reference voltages are represented by $4.44 \cdot f_1 \cdot Bm \cdot A \cdot N$ and $4.44 \cdot (2f_1) \cdot Bm \cdot A \cdot N$ respectively.

Let us assume that the center of operation of the saturable reactor 6 is the point $I_o$ of the exciting current and the output frequency of the generator 2 is expressed as $f_1$. When the exciting current of the saturable reactor 6 increases from $I_o$ to $I_1$, such a current is rectified by the rectifier 8 and then applied through the current-dividing resistor 9 to the controlling winding 51 of the magnetic phase shifter 5, whereby it is amplified and phase-shifted and applied to the thyristor device 4. Thus, the field current of the generator 2 is controlled at a lower level. On the other hand, when the exciting current is reduced to $I_2$ below $I_o$, the field current is so controlled as to be increased in a similar manner. In this way, the output voltage of the generator 2 can be controlled, that is to say, it is always maintained at a fixed level for a certain output frequency.

Subsequently when the output frequency of the generator 2 is changed to $2f_1$, the output voltage of the generator 2 can be so controlled as to be maintained at a level corresponding to the frequency $2f_1$, in exactly the same manner as with the frequency $f_1$.

Figure 3:
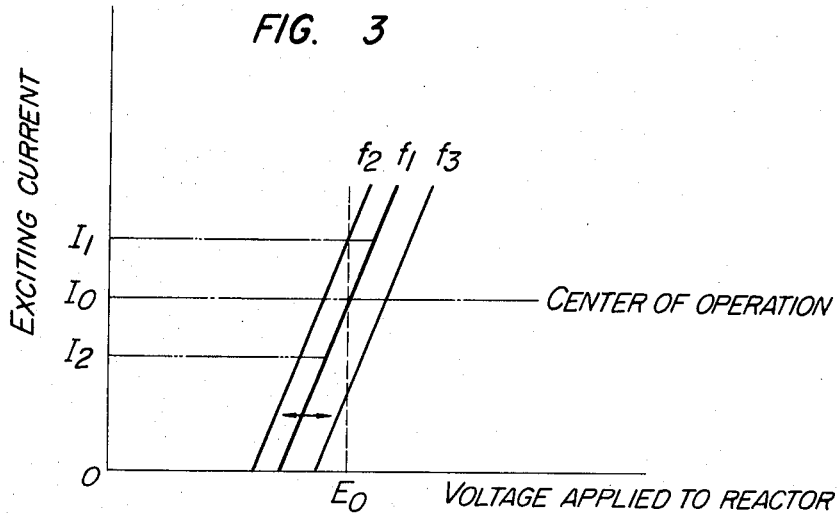
FIG. 3 is a diagram for explaining the operation of the voltage control apparatus according to the invention.

FIG. 3 is a diagram for explaining the actual operation of the saturable reactor 6 and shows the output frequency in relation to the applied voltage, that is, the output voltage of the generator 2 undergoes continuous variations in the directions of the arrow, that the variations in the exciting current of the saturable reactor 6 are inversely proportional to that in the output frequency if the output voltage $E_o$ of the AC generator 2 is fixed, and that variations in the exciting current are proportional to those in the output voltage if the output frequency $f_1$ is fixed.

Figure 4:
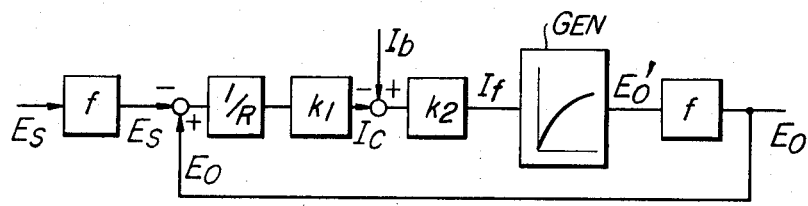
FIG. 4 is a block diagram of the circuit as shown in FIG. 1.

FIG. 4 summarizes the above-mentioned operation in a block diagram and shows an automatic control system whereby the output voltage of the AC generator 2 is made proportional to the output frequency thereof. In this figure, $E'_s$ shows a reference voltage for unit frequency, $f$ a frequency, $E_s$ a reference voltage ($4.44 \cdot f \cdot Bm \cdot A \cdot N$ in the case of FIG. 1), R the resistance value of the series resistor 7, $K_1$ a current division ratio of the current-dividing resistor 9, $I_c$ a current in the control winding 51 of the magnetic phase shifter 5, $I_b$ a bias current therein, $K_2$ an amplification factor, $I_f$ a field current, G a generator, $E'_o$ the generator output voltage per unit frequency, and $E_o$ a generator output voltage.

To achieve the objective of automatically controlling the output voltage in proportion to the frequency, the apparatus according to this invention can be so constructed that a reference voltage is easily produced and compared with the output voltage with the output voltage with high reliability.

Figure 5:
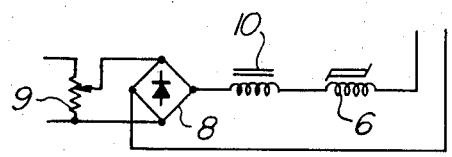
FIG. 5 is a diagram showing another embodiment of this invention.

Another embodiment of this invention is illustrated in FIG. 5, in which a linear reactor 10 instead of the series resistor 7 is employed thereby to improve the controlling characteristics. As is apparent from the block diagram of FIG. 4, the loop gain of the automatic control system is subject to change in accordance with the frequency $f$, and therefore when the range of frequency requiring control is wide, it may present an instability problem due to an excessively high loop gain in a high frequency range or a problem of increased offset due to an excessively low loop gain in a low frequency range.

However, according to the circuit arrangement of FIG. 5, the block 1/R of FIG. 4 is replaced by the block $1/2\pi fL$ (L showing the inductance of the linear reactor). Since the denominator of this fraction is offset with the block f at the extreme right of FIG. 4, the loop gain is constant regardless of the frequency $f$, thereby making possible a stable and high-precision controlled operation even if the frequency $f$ is varied over a wide range.

Incidentally, it is easy to change the value of the reference voltage by properly selecting the above-mentioned constants $Bm$, $A$ or $N$, and to change the loop gain by changing the dividing ratio of the current-dividing resistor 9, value of the series resistor 7 or linear reactor 10.

It is needless to say that, although the generator employed in the embodiment of FIG. 1 is self-excited, the apparatus according to the invention produces the same effect if a separately-excited generator is employed. Further, the loop included in the embodiment of FIG. 1 is such that the output of the generator is used to control the magnetic phase shifter, the output of which is used to control the thyristor device and the output of this thyristor device is again used to control the field system of the generator, and this invention is in no way limited to the above-mentioned construction but is also applicable to various modifications thereof without departing from the spirit and scope of the claims.

It will be seen from the above description that this invention achieves a means for maintaining a fixed ratio between the output voltage and output frequency of an AC generator, thereby providing a very effective control means with simple equipment for its control circuit.

We claim:

1. A voltage control apparatus for AC generators comprising:
   a saturable reactor excited by an output voltage of an AC generator to be regulated so as to be normally saturated, thereby generating a voltage proportional to the output frequency of said AC generator, and a current control means for controlling the field current in said AC generator by means of an exciting current of said saturable reactor, said exciting current flowing depending on the difference between the voltage generated in said saturable reactor and the output voltage of said AC generator.

2. A voltage control apparatus for AC generators according to claim 1, further comprising a resistor connected in series with said saturable reactor.

3. A voltage control apparatus for AC generators according to claim 1, further comprising a linear reactor connected in series with said saturable reactor.

4. A voltage control apparatus for an AC generator, comprising:
   first means, coupled to the output of the AC generator, for providing an exciting current, the magnitude of which corresponds to the difference between the voltage output of said AC generator and a reference voltage, the magnitude of said reference voltage being continuously proportional to the frequency of the voltage output of said AC generators; and
   second means, responsive to the output of said first means, for coupling said exciting current to said AC generator, whereby the ratio of the voltage output of said AC generator and the frequency thereof is maintained constant.

5. A voltage control apparatus according to claim 4, wherein said first means comprises a saturable reactor coupled between the output of said AC generator and said first means.

6. A voltage control apparatus according to claim 5, wherein said second means further includes means, connected to the output of said saturable reactor, for controlling the loop gain between the output of said AC voltage generator and the control input through which said exciting current is coupled.

7. A voltage control apparatus according to claim 6, wherein said loop gain controlling means comprises a resistive element connected in series with said saturable reactor.

8. A voltage control apparatus according to claim 6, wherein said loop gain controlling means comprises a linear reactor connected in series with said saturable reactor.

9. A voltage control apparatus according to claim 6, wherein said second means comprises a bias winding through which said current flows and a variable attenuator coupled to said saturable reactor, and a magnetic phase shifter responsive to the output of said winding and the output of said AC generator for supplying a control voltage to the field winding provided in said AC generator.

10. A voltage control apparatus according to claim 9, further including a bias voltage supplying winding inductively coupled to said bias winding for supplying a distortion compensating voltage thereto.

11. A voltage control apparatus according to claim 9, further including a rectifier bridge circuit coupled between said saturable reactor and said variable attenuator.

* * * * *